Dec. 22, 1925.
J. T. RENEAU
1,566,427
AUTOMOBILE LIFT
Filed June 21, 1924
2 Sheets-Sheet 1
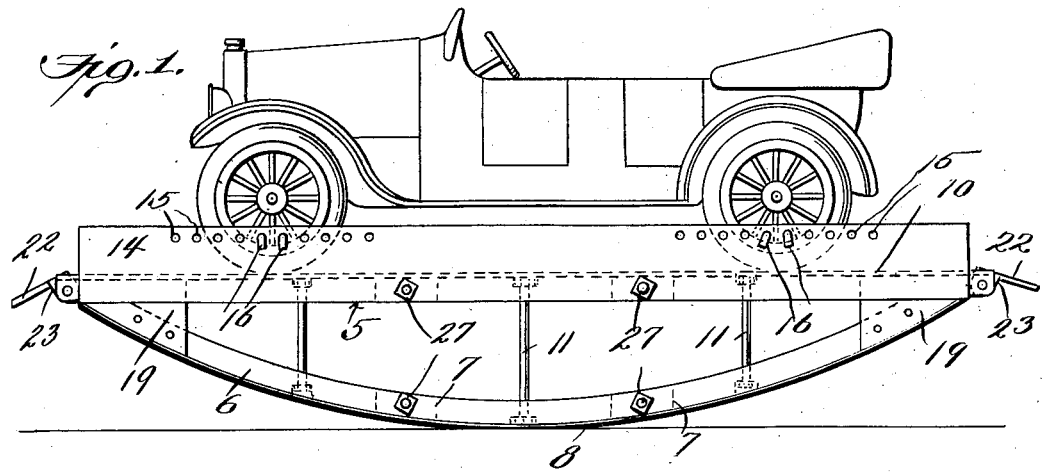
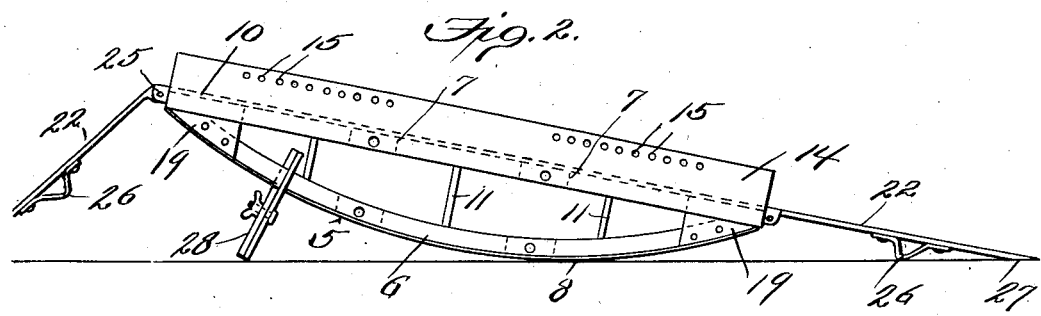
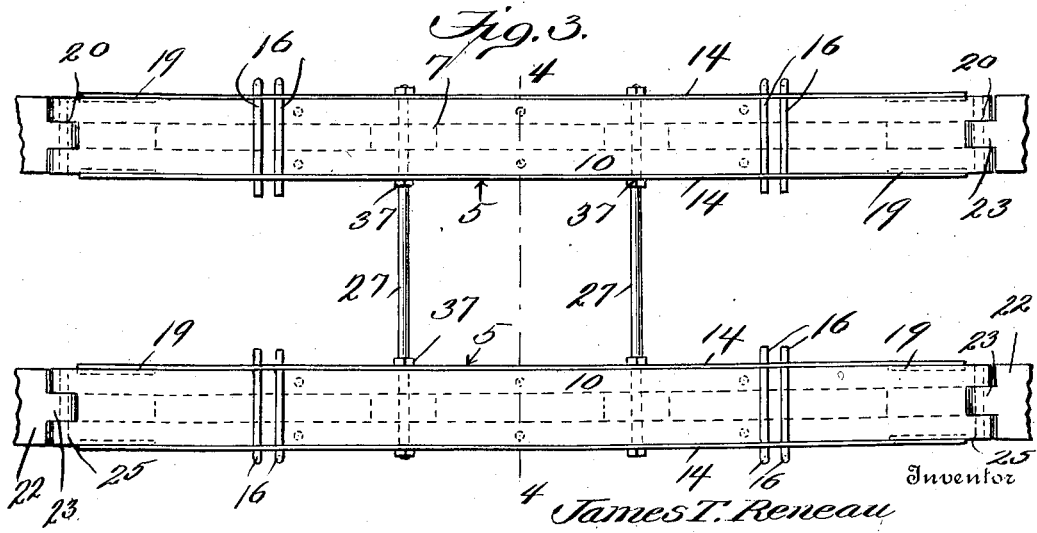
Inventor
James T. Reneau
By
Attorney Dec. 22, 1925.  
J. T. RENEAU  
AUTOMOBILE LIFT  
Filed June 21, 1924   2 Sheets-Sheet 2
1,566,427
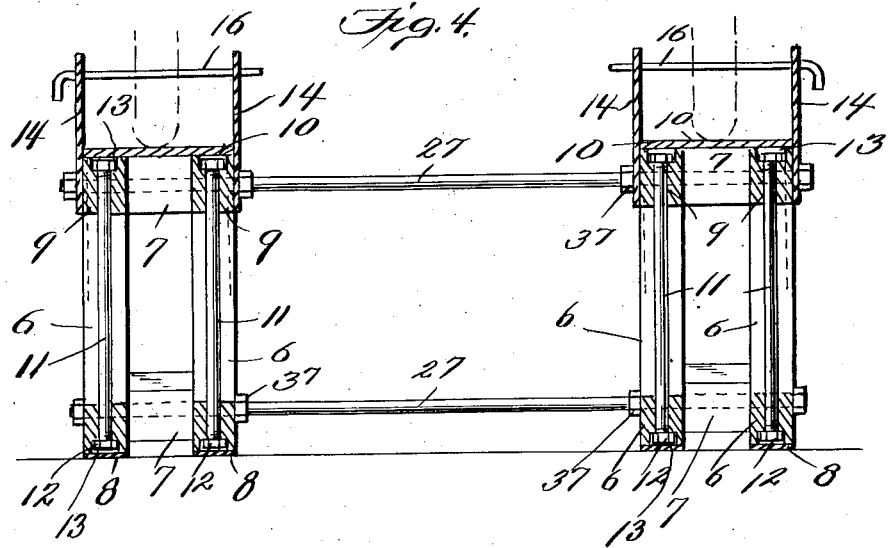
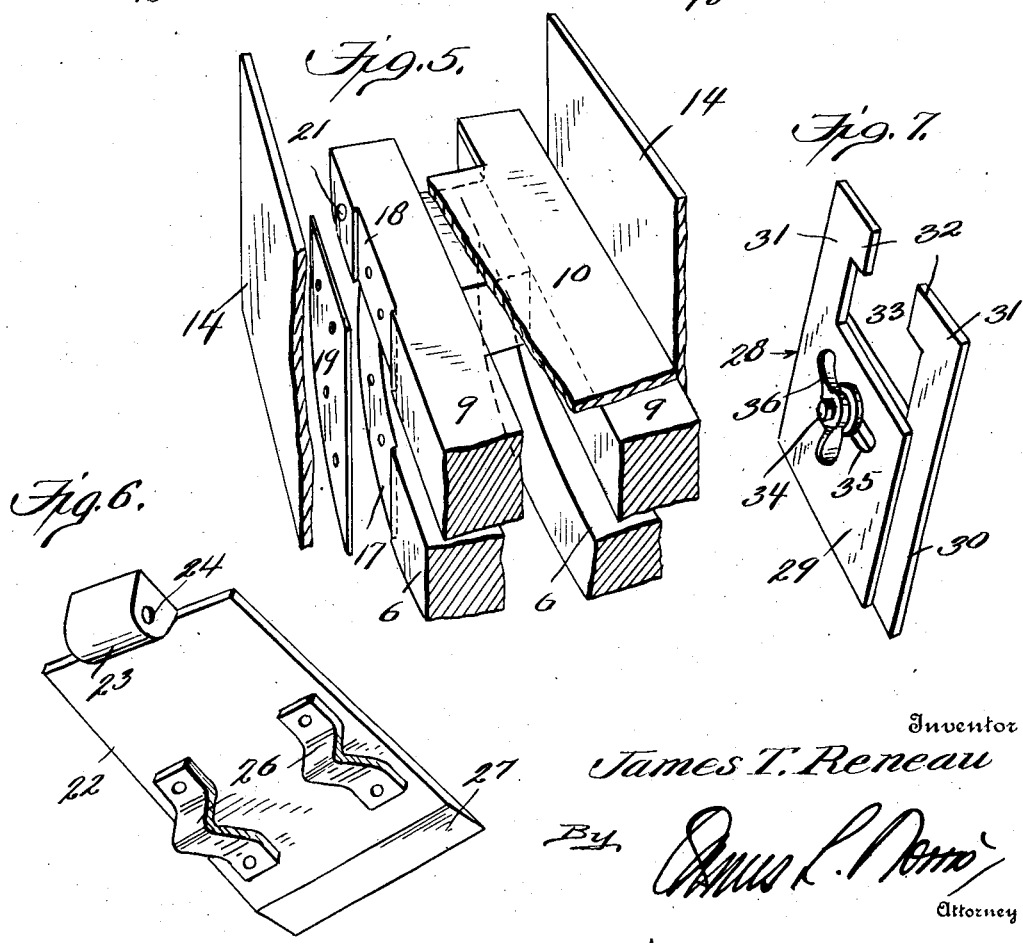
Inventor  
James T. Reneau  
By  
Attorney Patented Dec. 22, 1925.

1,566,427

UNITED STATES PATENT OFFICE.

JAMES T. RENEAU, OF NEW ORLEANS, LOUISIANA, ASSIGNOR OF ONE-HALF TO LAWRENCE E. COKER, OF NEW ORLEANS, LOUISIANA.

AUTOMOBILE LIFT.

Application filed June 21, 1924. Serial No. 721,556.

*To all whom it may concern:*

Be it known that I, JAMES T. RENEAU, a citizen of the United States, residing at New Orleans, in the parish of Orleans and State of Louisiana, have invented new and useful Improvements in Automobile Lifts, of which the following is a specification.

This invention relates to an automobile lift adapted to elevate and render the lower structure of an automobile readily accessible.

The primary object of the invention is to provide an automobile lift or elevating means to replace the usual form of pits and other fixed structures now commonly used for disposing an automobile in such position for repair that all of the under parts thereof may be readily reached without subjecting the operators or repairmen to inconvenience.

A further object of the invention is to provide an automobile lift or elevating means upon which an automobile may be readily disposed and repaired, and subsequently easily released, and to support the automobile at such height that repairmen may readily pass thereunder and be permitted to assume positions that will be more effective in expeditiously completing repairs or rectifying irregularities that may exist.

A still further object of the invention is to provide a strong and durable automobile lift or elevating means having a rocking structure of a novel form and onto and from which an automobile may readily move under its own power, and also provided with means for holding an automobile against movement thereon while undergoing repair.

With these and other objects and advantages in view, the invention consists in the construction and arrangement of the several parts which will be more fully hereinafter described and claimed.

In the drawings:

Fig. 1 is a side elevation of an automobile lift or elevating means embodying the features of the invention and showing an automobile in position thereon, the improved device being partially broken away at opposite extremities;

Fig. 2 is a view similar to Fig. 1 on a slightly reduced scale, showing the improved device in tilted position to permit an automobile to move upwardly thereonto;

Fig. 3 is a plan view of the improved device shown by Fig. 1 with the automobile removed;

Fig. 4 is a transverse vertical section on an enlarged scale taken on the line 4—4, Fig. 3;

Fig. 5 is a sectional perspective view of separated parts of a portion of one of the rocker units;

Fig. 6 is a detail perspective view of one of the terminal inclines, looking toward the bottom of the latter; and Fig. 7 is a detail perspective view of a support or crutch for holding the improved device against movement, particularly when disposed at an inclination to permit an automobile to move upwardly thereonto.

The numeral 5 designates two rocker units, which are duplicates in dimensions and general construction, and each comprises lower parallel rocking components 6 held separated by suitable space blocks 7 and provided with tires 8 extending the full length thereof. The rocker components also have upper horizontally disposed beams 9 with space blocks 7 therebetween and thereover track plates 10 are secured. Between the lower rocking components 6 of each unit and the beams 9 vertical brace rods 11 are interposed and have their ends screw-threaded and provided with nuts as at 12, the screw-threaded ends and nuts being countersunk in recesses 13, as clearly shown by Fig. 4. The brace rods 11 differ in length to compensate for the arcuate contour of the rocker components 6 and the consequent variation in distance of the latter from the beams 9. The beams 9 also have upwardly projecting guard flanges 14 secured to the outer sides thereof, and these flanges are provided with a plurality of transversely alined openings 15, to removably receive cross or locking rods 16. At the ends the rocking components 6 and beams 9 are respectively recessed, as at 17 and 18, to receive segmental tie plates 19, the lower portions of the opposite extremities of the guard flanges 14 being secured over the upper portions of these tie plates, as clearly shown by Figs. 1 and 2. The tie plates 19 reinforce the opposite ends of the rocker units, and the ends of the track plates 10 have central slots or recesses 20, and the adjacent ends of the beams 9 are formed with transverse openings 21 for the purpose of receiving end inclines 22, which simulate skids, each incline having a substantially semicircular knuckle boss 23 at the upper inner end thereof formed with an opening 24 therethrough for insertion in one of the end recesses 20 and between the ends of the beams 9, to receive a pintle or pin 25 passed through the openings 21 and 24, thereby forming a hinge connection for the incline or skid 22. Each incline or skid 22 is similarly hinged and is free to move or assume a proper angle relatively to the track plate 10 with which it is adapted to cooperate. The underside of each incline or skid 22 has a prop 26 and the outer free end at the underside is beveled or cut away at an angle, as at 27, to permit the said outer edge to closely fit the surface with which it engages and maintain a proper angle of inclination without an abutting shoulder or edge at the outer free end of the incline or skid. The two rocker units 5 are tied in fixed relation by upper and lower tie rods 27 passing through the rocker components 6, beams 9 and space blocks 7, which are interposed between the said rocker components and beams.

As an efficient accessory to the operation of the improved automobile lift or elevating means a support or crutch 28 is provided and, as shown by Fig. 7, consists of two laterally overlapping adjusting members or plates 29 and 30, each having at one side of the upper portion thereof an L-shaped or angular arm 31 with the angular member 32 thereof directed inwardly and separated by an open space 33, which will vary in accordance with the adjustment of the one plate with relation to the other. The one plate has a screw stud 34 projecting therefrom and extending through a slot 35 formed in the other plate, the said screw stud having a clamping nut 36 to maintain the plates in fixed adjustment. Each rocker unit may be engaged by one of the supports or crutches to hold the same in tilted position, as shown by Fig. 2, when it is desired to mount an automobile on the improved lift or elevating means, and the angular arms 31 are applied over the rocker components 6, and after adjustment of the plates 29 and 30 has been made to cause the said arms to snugly engage the rocker components, the clamping nut 36 is tightened and the lower end of the support of each crutch bears on the surface upon which the improved automobile lift or elevating means is operatively disposed. Each support or crutch 28 is disposed at an angle of inclination as shown by Fig. 2 and is adapted to be applied at either side of the vertical center of the improved lift or elevating means for the purpose of lowering either extremity of the latter to bring the incline or skid at the lower end of the improved device in position for easy movement thereover of the automobile wheels.

The operation of the improved device is very simple and it will be understood that an automobile may approach and move upwardly onto the rocker units and engage the track plates 10 from either end, and after the automobile has been properly disposed on the rocker units, the locking rods 16 are adjusted relatively to the openings 15 and guard flanges 14 to occupy positions between spokes of the wheels of the automobile as shown by Fig. 1, and thereby prevent the automobile from becoming accidentally disengaged or running off the rocker units. It is obvious that in the operation of the improved device the automobile will be run upwardly onto the rocker units from one extremity of the improved lift or elevating means, and after repair or other necessary manipulation the automobile may be released and move off of the improved lift at the opposite extremity, the inclines or skids 22 at opposite ends of the rocker units being readily disposable for service and, likewise, the supports or crutches 28 readily removable.

It will be seen that the rocker units have a continuous curvature without any flat portions, thereby making it possible to dispose the automobile in various positions lengthwise of the rocker units as may be desired, and even though the rocker units may be tilted in view of a heavier weight at one extremity of each than at the other extremity, when the automobile wheels are locked by the rods 16, the connection between the automobile and the improved device will remain positive. By this means it is possible to dispose the under portion of an automobile at different angles if found necessary, or maintain the same in horizontal position as shown by Fig. 1. All the parts of the improved device will be composed of such materials as are best adapted for the purpose and may be entirely of metal or a combination of metal and wood. The tie rods 27 are not only secured to the rocker units as heretofore explained, but the units are prevented from moving inwardly or changing their desired spaced relation by stop collars or nuts 37 secured thereon as clearly shown by Figs. 3 and 4. It is preferred that the tires or treads 8, guard flanges 14 and the segmental tie plates 19 as well as the vertical braces 11 and tie rods 27 be constructed of metal, but in some instances the rocker components 6 and beams 9 may be formed of wood of a suitable and durable character. However, the kinds of material used in forming the various parts will be determined by the strength and durability required in the effective operation and service of the improved device. It will also be understood that changes in the proportions and general dimensions of the several parts may be adopted without departing from the spirit of the invention.

What is claimed as new is:

1. In an automobile lift of the class specified, the combination of spaced rocker units having regular and continuous lower arcuate components which extend upwardly to and terminate at the ends of the units to form complete rocking base supports the full length of the units, the arcuate components being provided with upper track plates having inner and outer side guard flanges, and freely movable hinged inclines at opposite ends of the units for facilitating the movement of an automobile upwardly onto and downwardly from the track plates at either end of the said units.

2. In an automobile lift, the combination of spaced rocker units having transverse means for connecting them, each rocker unit being structurally a duplicate of the other and provided with lower arcuate components extending upwardly to and terminating at the ends of the units to provide rocking means extending the full length of the units, the said units also having upper track plates each formed at opposite sides with guard flanges having a plurality of transversely alined openings therein, inclined means movably attached to opposite ends of the rocker units for facilitating the movement of an automobile upwardly onto and downwardly from the track plates at either end of the units, means separably engaging the units at one extremity of each for holding the said units against rocking movement, and locking devices for the wheels of the automobile removably engaging the openings in the flanges and extending transversely with relation to the latter.

3. In an automobile lift of the class specified, the combination of duplicate rocker units provided with upper transversely extending securing means for holding the wheels of an automobile against movement thereon, each rocker unit comprising lower continuous arcuate components extending full length of the units and terminating in upward curves at the ends of the units, each rocker unit also having an upper horizontally flat track plate with upwardly projecting flanges at opposite sides formed with a plurality of transversely alined openings, inclines hinged to opposite ends of the units and freely movable for self-adjustment, the said inclines having rear reduced edges and under supports to hold the same in positive position relatively to the ends of the units and particularly in alinement with the track plates when the latter are tilted, adjustable supports to separably engage the rocking components at one end of each of the latter to hold the units against movement when an automobile is being mounted thereon, and means for removably engaging the said flanges and the wheels of an automobile to hold the latter against movement on the track plates.

4. An automobile lift of the class specified, having duplicate rocker units with lower continuous arcuate rocking components extending from end to end thereof, incline means hinged to opposite ends of the units, means for removably engaging portions of the units for holding the lift at an angle of inclination, said means consisting of adjustable supporting elements with top open spaces to fit the rocking components, and means for securing an automobile in fixed position on the rocker units.

5. An automobile lift of the class specified, comprising rocker units with curved rocker supports extending the full length thereof and provided with upper flat track plates having opposite side flanges projecting above the same, means hinged to opposite ends of the units for disposition at angles of inclination in line with the track plates to facilitate movement of automobiles upwardly onto and downwardly from said plates at either end of the rocker units, means removably associated with the said flanges for engaging the wheels of an automobile to hold the latter in fixed position on the units, and laterally adjustable means for engaging parts of the rocker units for holding the latter at an angle of inclination and applicable to either extremity of the units, the said laterally adjustable means consisting of overlapping plates having open spaces at their upper ends to separably engage the rocker supports.

In testimony whereof I have hereunto set my hand.

JAMES T. RENEAU.